United States Patent [19]
Bulgarelli

[11] Patent Number: 5,974,832
[45] Date of Patent: Nov. 2, 1999

[54] METHOD FOR MANUFACTURING GLASS AND GOLD SLABS FOR MOSAICS

[75] Inventor: Vittorio Bulgarelli, Via Argine Destro Reno, Italy

[73] Assignee: Sicis International S.r.l., Ravenna, Italy

[21] Appl. No.: 08/974,961

[22] Filed: Nov. 20, 1997

[30] Foreign Application Priority Data

Nov. 25, 1996 [IT] Italy ................................ BO96A0607

[51] Int. Cl.⁶ ............................ C03C 17/02; C03C 17/10
[52] U.S. Cl. ................................ 65/60.2; 65/50; 65/60.4; 65/60.8; 427/149; 427/376.7; 427/383.5; 427/404
[58] Field of Search ............................ 65/23, 60.2, 60.4, 65/60.8, 50; 427/149, 376.7, 383.5, 404; 428/630, 631

[56] References Cited

U.S. PATENT DOCUMENTS

| | | | |
|---|---|---|---|
| 2,521,846 | 9/1950 | Gregory | 428/34.6 |
| 3,328,145 | 6/1967 | McMillan et al. | 65/33.5 |
| 3,793,167 | 2/1974 | Glaser | 204/192 |
| 4,313,026 | 1/1982 | Yamada et al. | 174/68.5 |
| 4,725,333 | 2/1988 | Leedecke et al. | 156/630 |
| 5,189,952 | 3/1993 | Ohmura et al. | 101/211 |
| 5,391,247 | 2/1995 | Kamen et al. | 156/233 |

FOREIGN PATENT DOCUMENTS

| | | |
|---|---|---|
| 9104758 | 5/1993 | Brazil . |
| 0 719 747 | 7/1996 | European Pat. Off. . |
| 109 496 | 2/1900 | Germany . |
| 10 85 904 | 7/1960 | Germany . |
| 2 147 932 | 3/1973 | Germany . |
| 3835402 | 3/1990 | Germany . |
| 923 764 | 4/1963 | United Kingdom . |

*Primary Examiner*—Sean Vincent
*Attorney, Agent, or Firm*—Guido Modiano; Albert Josif

[57] ABSTRACT

A method for manufacturing glass and gold slabs for mosaics, comprising the steps of: applying a fluid or semi-fluid suspension that contains gold to a glass sheet of suitable thickness; heating the sheet and the suspension so as to obtain a film-like coating of the sheet according to the intended extension and contour; protecting the film-like covering with a thin layer of molten glass; and heating the sandwich of layers so as to obtain a single sheet composed of the glass of suitable thickness, the gold coating and the thin glass layer.

6 Claims, No Drawings

METHOD FOR MANUFACTURING GLASS AND GOLD SLABS FOR MOSAICS

BACKGROUND OF THE INVENTION

The present invention relates to a method for manufacturing glass and gold slabs for mosaics.

Even nowadays, the method for manufacturing glass and gold slabs for preparing gold mosaics is still a substantially skill-intensive manual process, and owing to its high costs it is performed by master glassmakers to produce mosaic compositions of particular artistic value.

The method consists in forming, by blowing, globes of thin glass which are then split so as to form convex square pieces. These square pieces are then deposited on a flat iron scoop with their concave side facing downward and a gold leaf is applied thereto by means of a wet process.

The scoop is then transferred into a furnace, where the heat flattens the square piece. Molten glass is then poured onto the gold leaf in an amount sufficient to form a considerably thick layer. A slab is thus obtained in which the gold leaf is perfectly embedded.

The tesserae for composing the mosaic are then cut from the slab. The tesserae are applied by interposing a suitable binding agent between the surface to be covered (wall, floor, ceiling) and the thicker layer of glass, so that the exposed face is the one covered by the thin layer of glass.

The conventional method for manufacturing gold mosaic tesserae entails some considerable drawbacks, which consist in the limited size of the slabs that can be obtained, also because it is very difficult to maintain the integrity of the surface of the gold leaf for sizes greater than approximately 10×10 cm. Another drawback of the prior art is the fact that the gold leaf, being extremely fragile, can be applied only manually and therefore entails considerable labor costs.

SUMMARY OF THE INVENTION

The aim of the present invention is to provide a new method for manufacturing glass and gold slabs which allows to obviate the above shortcomings of the prior art.

This aim is achieved with a method for manufacturing glass and gold slabs for mosaics, characterized in that it comprises the following steps of: applying a fluid or semifluid suspension that contains gold to a glass sheet of suitable thickness; heating the sheet and the suspension so as to obtain a film-like coating of said sheet according to the intended extension and contour; protecting the film-like covering with a thin layer of molten glass; and heating the sandwich of layers so as to obtain a single sheet composed of the glass of suitable thickness, the gold coating and the thin glass layer.

DESCRIPTION OF THE PREFERRED EMBODIMENTS

In the practical execution of the invention, the glass sheet of suitable thickness can be a sheet of normal glass, which is commercially available and is particularly inexpensive. Moreover, so-called liquid gold or gold in paste form, which consists of gold dust suspended in a substance which acts as a vehicle for the gold dust and is suitable to volatilize by combustion, are used as fluid or semifluid suspension to be applied.

It should be noted that during the heating step, the vehicle used to obtain a liquid or pasty gold suspension is burned, leaving a pure gold film which in the subsequent step for the application of the molten glass layer remains embedded between said latter layer and the thicker glass sheets without forming bubbles or impurities.

The fluid or pasty suspension can be applied with any screen-printing method or by means of a brush or roller or by means of decal transfers. The only requirement is that during the first step the vehicle must migrate without leaving visible traces.

It is evident that the above-described method fully achieves the intended aim. It in fact allows to prepare lo glass slabs for mosaics of any size, since there is no risk to the integrity of the gold film-like coating, which preserves its compactness thanks to the methods with which it can be applied to the sheet.

Another advantage of the described method is the fact that the formation of the layers does not require to resort to gold leaf, which is difficult to find commercially in view of the fact that the craft of the gold beater is all but extinct.

Another advantage is the possibility of industrializing the method for applying the gold film coating. Liquid gold or gold paste can in fact be applied with conventional screen-printing and transfer methods and therefore more precisely and quickly and ultimately more conveniently than with current systems, in which labor has a much higher effect on cost.

It should also be noted that the gold in the liquid or pasty state can be applied according to the chosen contour and without having to resort to subsequent cutting, which is often almost impossible to perform due to the shape that must be given to the gold and is in any case very expensive.

What is claimed is:

1. A method for manufacturing glass and gold slabs for mosaics, comprising the successive steps of:
    a) applying a fluid or semifluid suspension that contains gold to a glass sheet of suitable thickness;
    b) heating the glass sheet and the suspension formed in step a) so as to obtain a gold film coating on said sheet according to the intended extension and contour;
    c) applying to the gold film coating obtained in step b) a thin layer of molten glass so as to form a sandwich of layers including the glass sheet, the gold film coating, and the thin layer of molten glass; and
    d) heating said sandwich of layers formed in step c) and subsequently cooling said sandwich of layers after the heating thereof so as to obtain a single sheet composed of the glass sheet of suitable thickness, the gold film coating, and a thin solid glass layer which is thinner than said glass sheet.

2. A method according to claim 1, wherein said suspension is in liquid form.

3. A method according to claim 1, wherein said suspension is in pasty form.

4. A method according to claim 1, wherein said suspension is applied by screen printing.

5. A method according to claim 1, wherein said suspension is applied by means of a decal transfer method.

6. A method according to claim 1, wherein said suspension is applied by means of a brush or roller.

* * * * *

UNITED STATES PATENT AND TRADEMARK OFFICE
CERTIFICATE OF CORRECTION

PATENT NO. : 5,974,832
DATED : November 2, 1999
INVENTOR(S) : Bulgarelli, Vittorio It is certified that error appears in the above-identified patent and that said Letters Patent is hereby corrected as shown below:

Title page, item [75], inventor: should read --Vittorio Bulgarelli, S. Alberto di Ravenna, Italy--

Signed and Sealed this

Twelfth Day of September, 2000

Attest:

Q. TODD DICKINSON

Attesting Officer

Director of Patents and Trademarks